United States Patent [19]
Kajita et al.

[11] Patent Number: 5,537,217
[45] Date of Patent: Jul. 16, 1996

[54] IMAGE REPRODUCING DEVICE

[75] Inventors: Satoshi Kajita; Kazuo Kajimoto, both of Neyagawa; Rumi Tsubota, Hirakata, all of Japan

[73] Assignee: Matsushita Electric Industrial Co., Ltd., Osaka, Japan

[21] Appl. No.: 306,998

[22] Filed: Sep. 16, 1994

[30] Foreign Application Priority Data

Sep. 20, 1993 [JP] Japan ................. 5-232919

[51] Int. Cl.⁶ ........................... H04N 5/76
[52] U.S. Cl. ........................... 358/342; 358/335
[58] Field of Search ................. 358/342, 335, 358/342, 310, 311, 314, 327, 336, 340; 369/47, 48; 360/13, 14.1, 27, 32, 38.1

[56] References Cited

U.S. PATENT DOCUMENTS

| | | | |
|---|---|---|---|
| 4,930,014 | 5/1990 | Maeda et al. | |
| 5,150,462 | 9/1992 | Takeda et al. | |
| 5,402,247 | 3/1995 | Kuroda | 35/335 |
| 5,414,686 | 5/1995 | Iitsuka | 369/48 |
| 5,416,601 | 5/1995 | Wilkinson | 358/335 |
| 5,452,097 | 9/1995 | Koga et al. | 358/342 |

*Primary Examiner*—Thai Q. Tran
*Assistant Examiner*—Robert Chevalier
*Attorney, Agent, or Firm*—Price, Gess & Ubell

[57] ABSTRACT

An image reproducing device comprises an edit information storing unit for storing edit information, an image information storing unit for storing image information which can be accessed randomly, an image reproducing unit for reading image information from the image information storing unit and reproducing it, a reading controlling unit for controlling a faulty area storing unit which stores faulty area information according to edit information from the edit information storing unit, an image displaying unit for displaying image information from the image reproducing unit, a faulty field calculating unit for calculating a faulty field according to faulty area information from the faulty area storing unit, a copy range calculating unit for calculating a copy range according to faulty field information from the faulty field calculating unit, and a copy implementing unit for copying image information to the image storing unit according to copy range information from the copy range calculating unit, and registering edit information about copied image into the edit information storing unit.

13 Claims, 8 Drawing Sheets

| frame identifier | frame | start address | end address |
|---|---|---|---|
| 1 | A | 01 | 02 |
| 2 | B | 02 | 03 |
| 3 | C | 03 | 04 |
| 4 | D | 04 | 05 |
| 5 | E | 05 | 06 |
| 6 | F | 06 | 07 |

| frame identifier | frame | start address | end address |
|---|---|---|---|
| 1 | A | 01 | 02 |
| 2 | B | 02 | 03 |
| 3 | C | 03 | 04 |
| 7 | D1 | 04 | 04s |
| 8 | D2 | 04's | 04'e |
| 9 | D3 | 04e | 05 |
| 5 | E | 05 | 06 |
| 6 | F | 06 | 07 |

Fig. 10
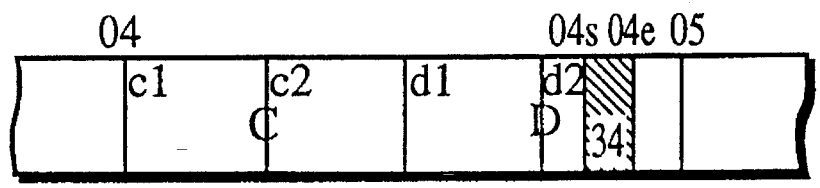
Fig. 11
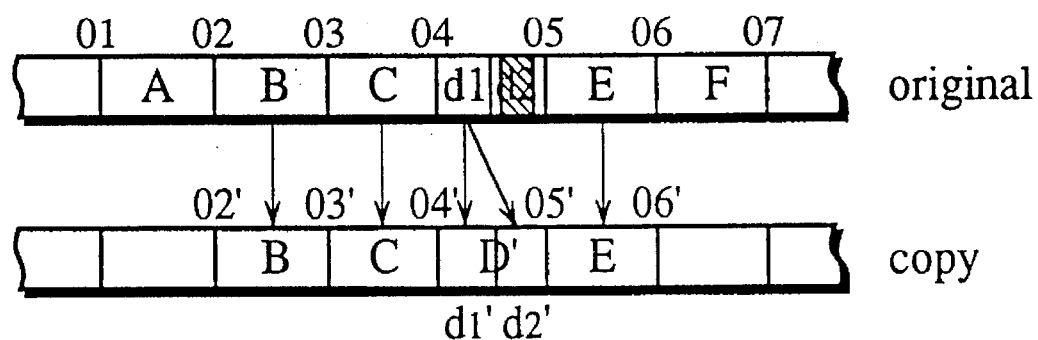
Fig. 12
| frame identifier | frame | start address | end address |
|---|---|---|---|
| 1 | A | 01 | 02 |
| 7 | B | 02' | 03' |
| 8 | C | 03' | 04' |
| 9 | D' | 04' | 05' |
| 10 | E | 05' | 06' |
| 6 | F | 06 | 07 |

IMAGE REPRODUCING DEVICE

BACKGROUND OF THE INVENTION (1) Field of the Invention

The present invention relates to an image reproducing device for reading an image from a recording medium and reproducing it upon each reception of reproduction request.

(2) Description of Related Art

An image reproducing device is preferably installed at a post production studio where edited images are stored in a hard disk or the like, while reproduced images are stored in tapes to be distributed to users such as a broadcasting station.

Such image reproducing device stores images into recording medium; however, recording medium is frequently damaged during transportation or storage. A partial image recorded in damaged part of recording medium cannot be reproduced; therefore, successive image reproduction is annoyed by unavoidable damage on recording medium.

This problem is described with a conventional image reproducing device.

FIG. 1 is a block diagram depicting the configuration of a conventional image reproducing device.

FIG. 2 shows an example of image recording medium which stores image information. The image recording medium in FIG. 2 includes image frames A, B, C, D, E, and F in which the frame D includes a faulty sector expressed by slash lines.

FIG. 3 shows an example of edit information stored in an edit information storing unit 1501. The edit information storing unit 1501 stores frame identifier, frame, and start address and end address indicating the start and the end of each frame. It is assumed that image information in FIG. 2 is read and reproduced. A reading controlling unit 1502 obtains information representing start address and end address of the frame A from the edit information storing unit 1501, and reads the frame A. The frame A can be read normally if no fault is included in itself stored in an image storing unit 1503, and it is sent to the an image reproducing unit 1504. Subsequently, the image reproducing unit 1504 sends the frame A to an image display unit 1505, and the image display unit 1505 displays image information of the frame A. Consequently, the frame A is reproduced. Similarly, the frames B and C are read and reproduced successively. After reading and reproducing the frame C, the reading control unit 1502 tries to read the frame D. However, the frame D cannot be read normally because of damage included in itself stored in the image storing unit 1503. The reading control unit 1502 judges that the frame D includes an faulty sector. Accordingly, as shown in FIG. 4, the reading control unit 1502 makes a substitution sector in a vacant area of the image storing unit 1503. Also, the reading control unit 1502 updates edit information stored in the edit information storing unit 1501 to read the substitution sector instead of the faulty sector.

FIG. 5 shows an example of updated edit information. The frame D in FIG. 4 is divided into three divisions D1, D2, D3; also a frame identifier 4 in FIG. 3 is divided into frame identifiers 7, 8, 9 in FIG. 5. Therefore, the reading controlling unit 1502 can read data successively by reading frames A, B, C, D1, D2, D3, E, and F in order according to the edit information in FIG. 5 which is stored in the edit information storing unit 1501.

However, this image reproducing device simply prepares a substitution sector with the reading controlling unit 1502 to overcome a faulty sector, and no image information is included in such substitution sector. As a result, reproduced image by the image reproducing unit 1504 includes an interruption for a moment, so that the original image cannot be reproduced.

Further, even if information at faulty sector is written into substitution sector, a reading head must migrate across sectors D1→D2→D3 within the time for reading one frame; therefore, successive reproduction is hardly possible. More specifically, migration of the reading head D1→D2 and D2→D3 requires seek time which consists of the time taken to rotate recording medium and the time taken to migrate the head to a certain track. In addition, generally a spare area for substitution sector is located at the most periphery or around the center of recording medium, so that the seek continues longer than expected, and it cannot be finished within the time limit set for reading a single frame. As a result, successive reproduction is hardly possible.

SUMMARY OF THE INVENTION

It is an object of the present invention to provide an image reproducing device for assuring successive reproduction even when a faulty sector is included in recording medium, and reconstructing an image of the faulty sector at the respective substitution sector.

The above object may be fulfilled by an image reproducing device comprising an image storing unit for storing video frames, having a preset minimum frame number which guarantees successive reproduction if the video frames are stored successively in physical sense, reading the video frames at speed which is in synchronous with a display cycle of one video frame as long as more than the minimum frame number of video frames are stored successively, and halting output of each video frame if its storage area includes a faulty area; an edit information storing unit for storing edit information which identifies which area of the image storing unit stores each video frame, a reading controlling unit for directing order of the video frames to be read from the image storing unit and controlling output of each video frame being in synchronous with the display cycle, a reproducing and displaying unit for reproducing and displaying the video frames outputted from the image storing unit in order; a faulty area detecting unit for monitoring output of each video frame being in synchronous with the display cycle, and detecting the video frame with the faulty area; a faulty area location calculating unit for calculating location of the video frame which includes the faulty area; a copy range setting unit for setting a plurality of video frames which include the video frame with the faulty area and which are more than the preset minimum frame number as a copy range; a vacant area reserving unit for reserving a vacant area within the image storing unit to which all the video frames set as the copy range can be copied; a copy unit for directly copying the video frames set as the copy range except the video frame with the faulty area into the vacant area, and processing the video frame with the faulty area by copying a preset range of image which locates outside the faulty area of the video frame into a part of the vacant area which is reserved for the video frame repeatedly; and an edit information updating unit for updating the edit information stored in the edit information storing unit into the edit information obtained after copying by the copy unit.

The image storing unit may comprise a recording medium for recording image including the video frames, a head for reading the preset minimum frame number of video frames which guarantee successive reproduction as a single block in a preset block cycle, and a FIFO to which the retrieved block data is transferred.

The recording medium may be either a hard disk or an optical disk.

The FIFO may output underflow when it tries to output the video frame with the faulty area, and the faulty area detecting unit may judge the underflow as the video frame with the faulty area.

Each video frame may include two image fields to be scanned according to an interlaced scanning method; the faulty area detecting unit may detect the field with the faulty area; the faulty area location calculating unit may calculate location of the faulty area relating to the frame and the field; and the copy unit may include a double copying unit for dividing the video frame including the faulty area into a field including the faulty area and a field which does not include the faulty area, setting the field which does not include the faulty area as the copy range, and copying the copy range into the vacant area which is reserved for the video frame which includes the faulty area twice.

The reading controlling unit may comprise a pointer for designating the video frames for a single block to be transferred from the recording medium to the FIFO, and changing its value at the end of each block transfer, and a counter for changing its value upon each output of one image field from the FIFO and resetting itself when the pointer changes its value; and the faulty area location calculating unit may calculate location of the faulty area relating to the frame and the field according to the value of the pointer and the value of the counter obtained at the moment that the FIFO outputs the underflow.

The copy range setting unit may set the video frames pointed by the pointer at the moment that the FIFO outputs the underflow as the copy range.

The image storing unit may store a compressed image, and the reproducing and displaying unit may have an expanding unit for expanding the compressed image from the image storing unit.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 10 illustrates a faulty area;

FIG. 11 illustrates copy processing;

FIG. 12 illustrates edit information after copy processing stored in an edit information storing unit;

DESCRIPTION OF PREFERRED EMBODIMENT

EMBODIMENT 1

Figure 6:
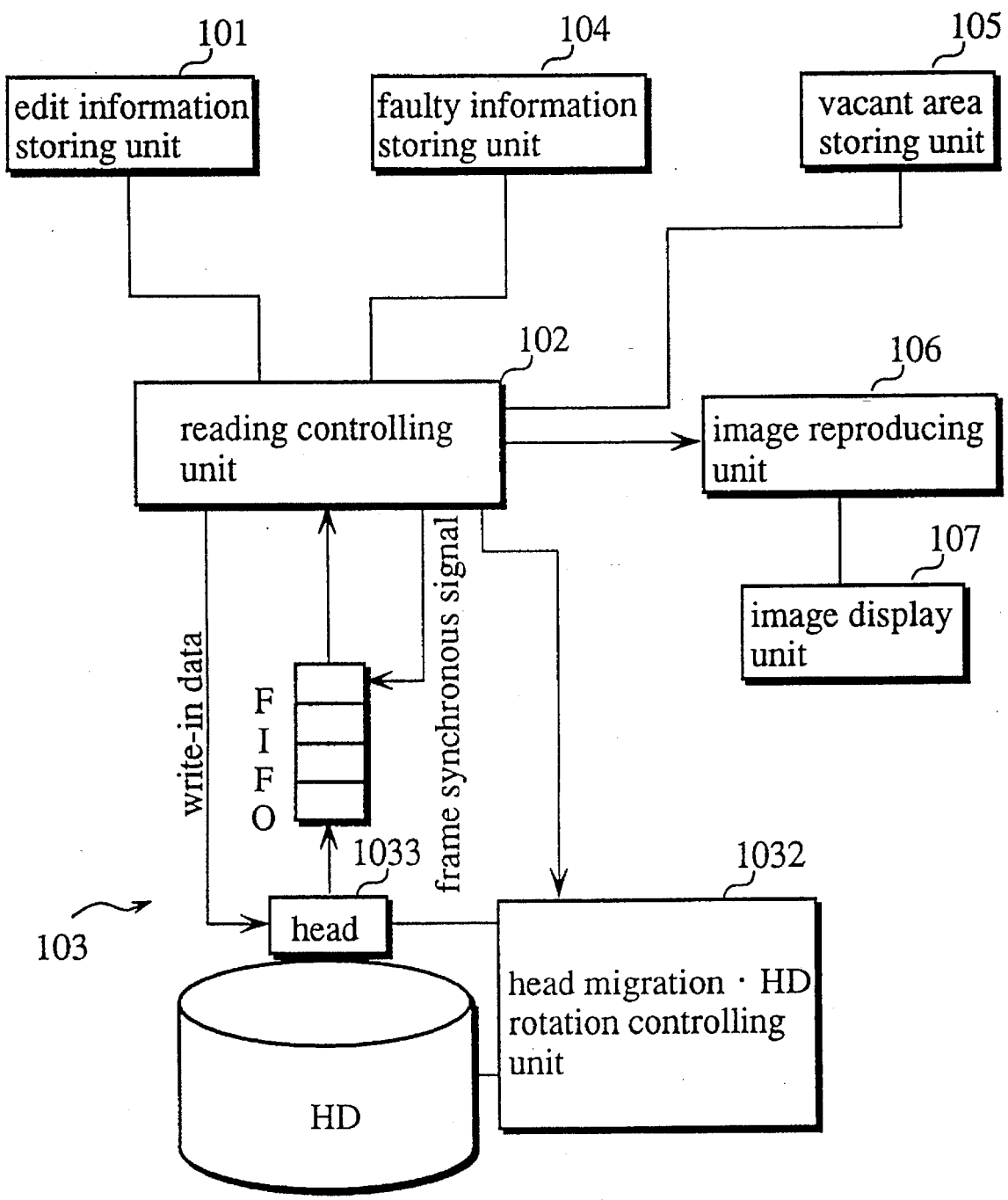
FIG. 6 is a block diagram depicting an image reproducing device in a first embodiment of the present invention.

An image reproducing device in a first embodiment of the present invention is described as referring to the drawings. FIG. 6 is a block diagram depicting an image reproducing device in the embodiment. The image reproducing device in FIG. 6 comprises an edit information storing unit 101, a reading controlling unit 102, an image storing unit 103, a faulty information storing unit 104, a vacant area storing unit 105, an image reproducing unit 106, and an image display unit 107.

As shown in FIG. 6, the image storing unit 103 comprises a hard disk HD, a FIFO, and a head migration•HD rotation controlling unit 1032.

A head 1033 of the hard disk HD accesses the hard disk HD to read or write data in responsive to a read/write switch direction from the reading controlling unit 102.

In reading, a single block of data consisting of a plurality of image frames is transferred from the hard disk HD to the FIFO. Then, a single frame of image is transferred from the FIFO to the reading controlling unit 102 in one frame cycle.

If a plurality of image frames are recorded successively in the hard disk HD in physical terms, the head 1033 can read and transfer a block of data consisting of a plurality of image frames. It is assumed herein that a single block consists of four frames of image data, so that an area containing four physically successive frames is read and transferred to the FIFO at one time. While the FIFO outputs one frame in one frame cycle, it reads the next block consisting of four frames from the hard disk HD. Therefore, as long as four frames are recorded in the hard disk HD successively, the FIFO can output a single frame being in synchronous with a frame cycle.

Herein, a single frame of image consists of two fields, and each field occupies 48 sectors of the hard disk HD.

For convenience of the description, a minimum number of successively recorded frames which guarantee output of one frame in one frame cycle from the image storing unit 103 is called as minimum cut length. The minimum cut length herein is four. The minimum cut length may also be eight if it is expressed by field.

Figure 1:
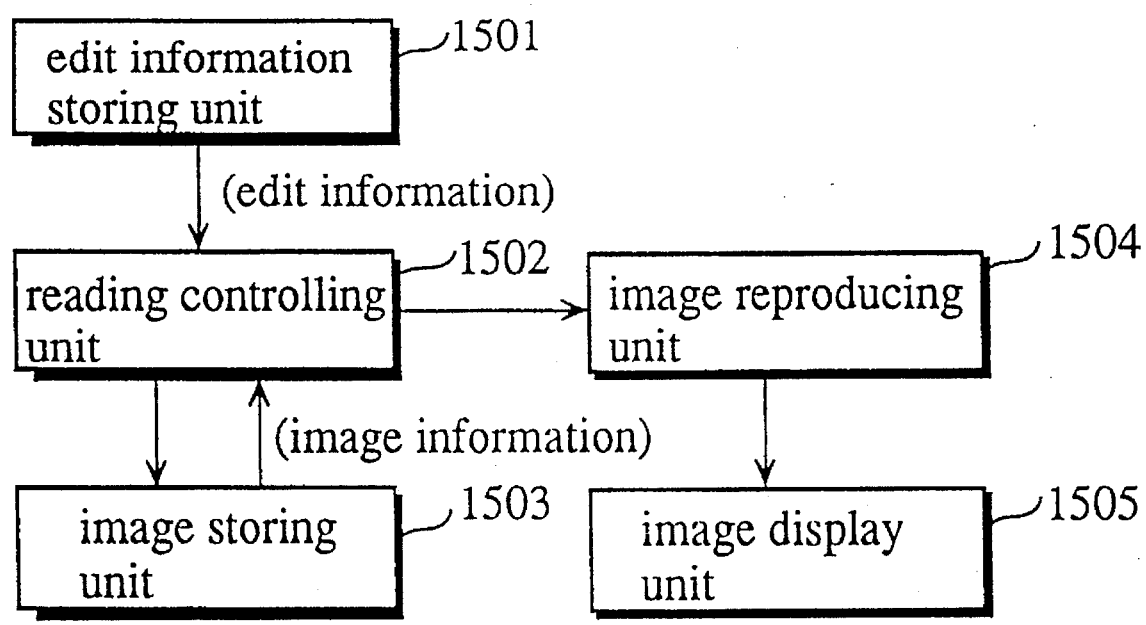
FIG. 1 is a block diagram depicting a conventional image reproducing device.
Figure 2:
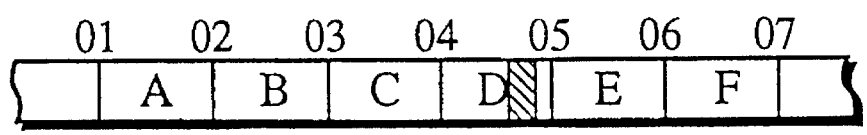
FIG. 2 illustrates a medium for storing an image with a faulty sector.

Being the same as the edit information storing unit in FIG. 1, the edit information storing unit 101 manages and stores frame identifier, frame name, and start address and end address of each frame on recording medium.

If there is a faulty sector which is not readable because of a damage on the hard disk HD, information about such faulty sector is stored in the faulty information storing unit 104. Such information includes frame number and field number by which the location of the faulty sector is identified. That is, frame and field including the faulty sector is identified by frame number and field number.

The vacant area storing unit 105 stores sector address of a vacant area which is constructed at the hard disk HD for a reserve.

In responsive to a reproduction request from outside, the reading controlling unit 102 requests the image storing unit 103 to output one frame at a time in the order indicated by edit information in the edit information storing unit 101, and outputs image frames from the image storing unit 103 to the image reproducing unit 106. If there is a frame which cannot be reproduced because of a faulty sector, minimum cut length of frames including the frame with a faulty sector are reconstructed.

Figure 7:
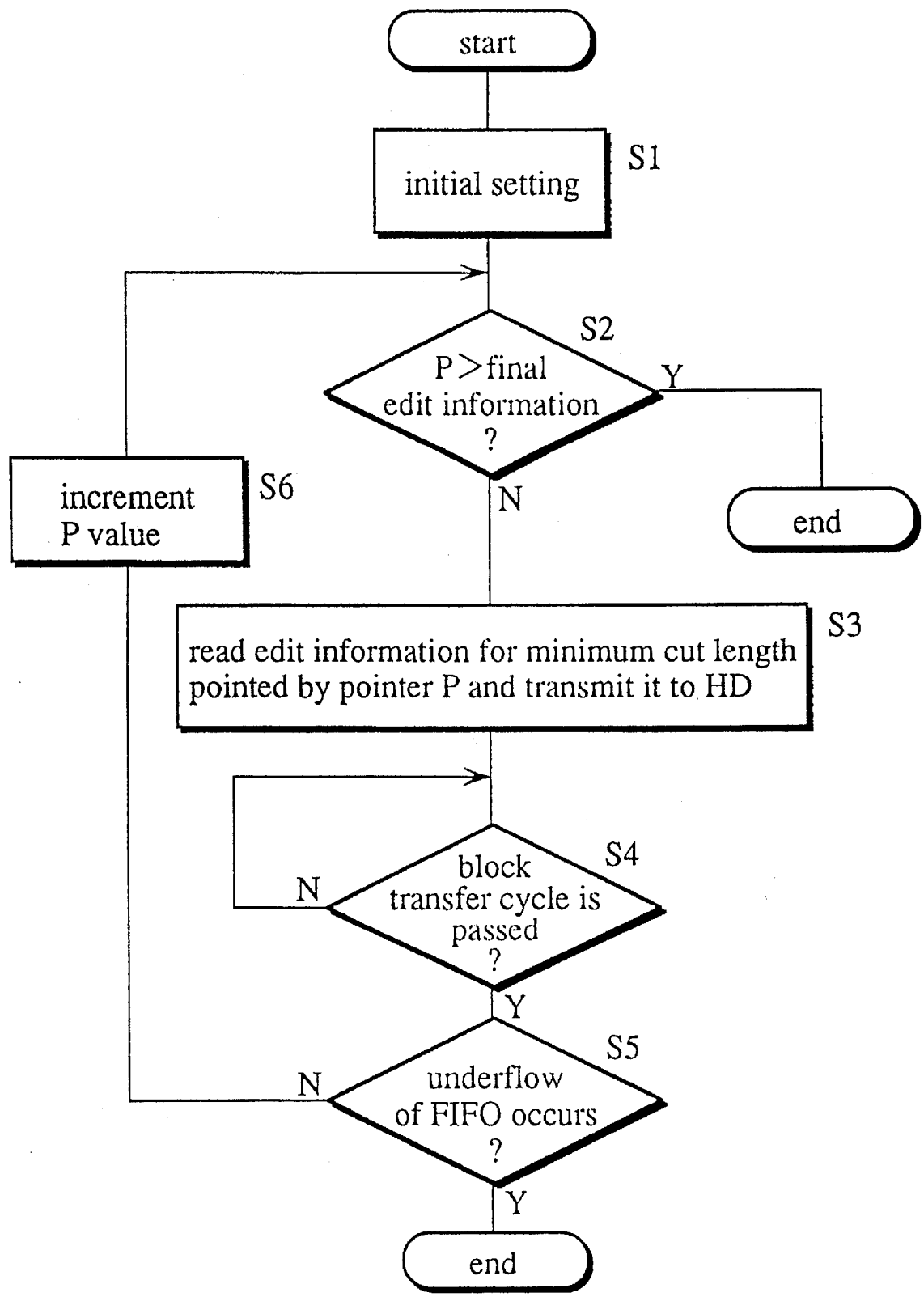
FIG. 7 is a flow chart describing block transfer control operation of a reading controlling unit.
Figure 8:
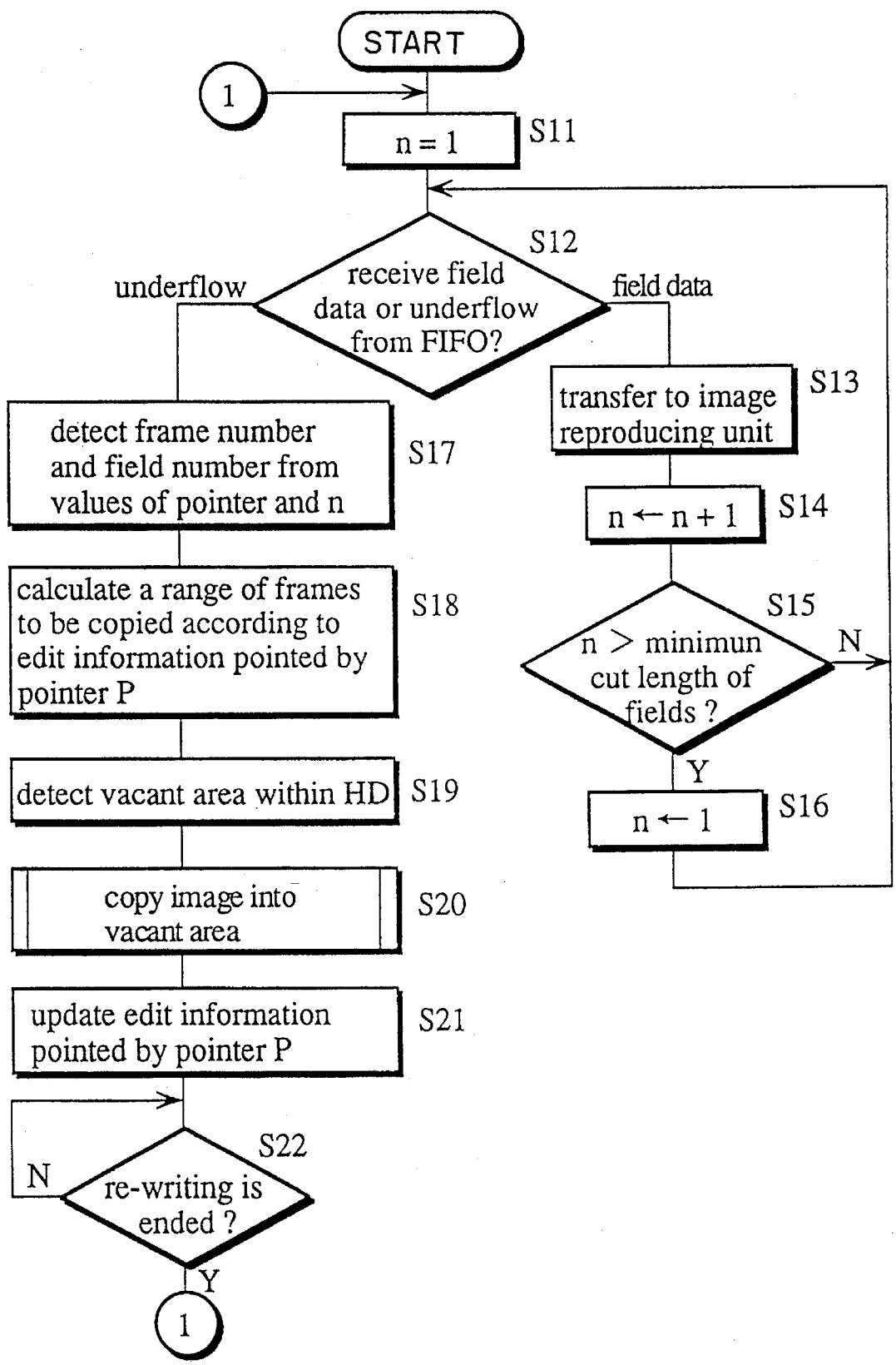
FIG. 8 is a flow chart describing image reproduction and reconstruction control.
Figure 9:
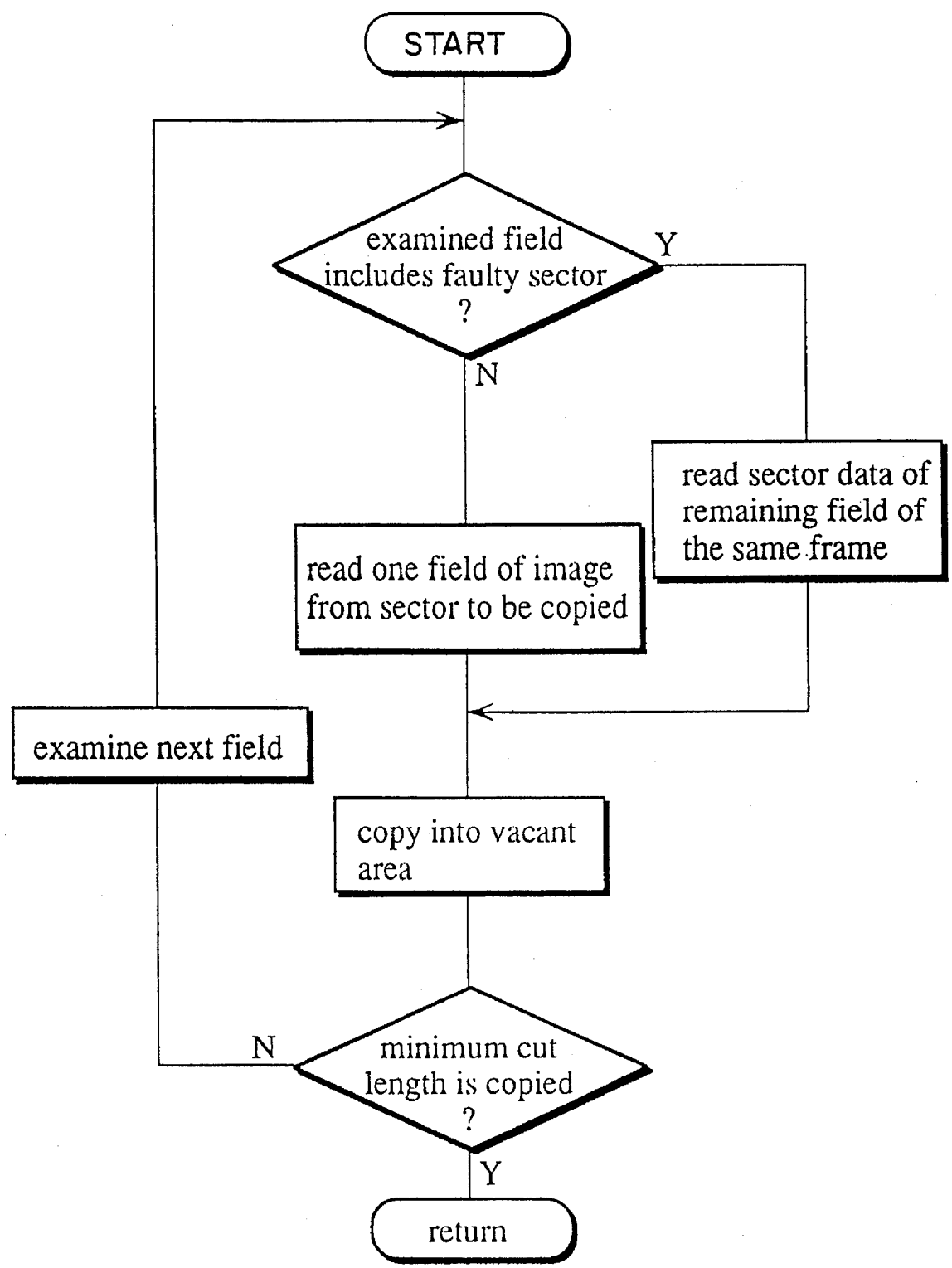
FIG. 9 is a flow chart describing step S20 of FIG. 8 in detail.

FIGS. 7–9 are flow charts describing the above control of the reading controlling unit 102, which will be described in detail below with image reproducing operation.

The image reproducing unit 106 is a well known circuit for processing frame data transferred from the FIFO via the reading controlling unit 102 into raster scan signal.

The image display unit 107 comprises a CRT or the like to display an image on screen according to raster scan signal from the reproducing unit 106.

Figures 3, 4, 5:
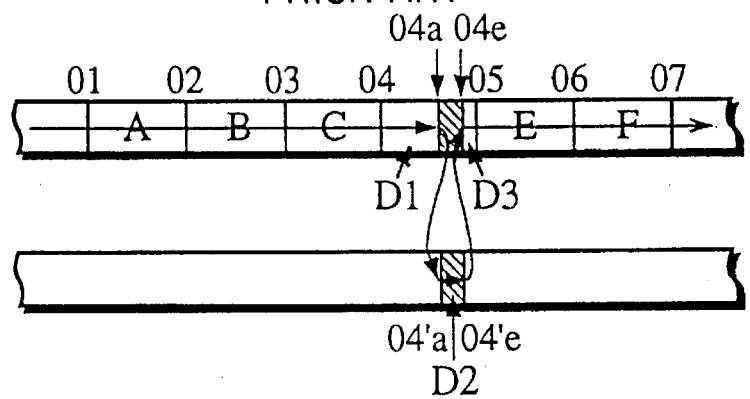
FIG. 3 illustrates edit information stored in an edit information storing unit.
FIG. 4 illustrates reproduced image by the conventional image reproducing device after reconstruction.
FIG. 5 illustrates edit information after reconstruction stored in the edit information storing unit of the conventional image reproducing device.

Image reproducing operation with the above constructed device is described as referring to flow charts of FIGS. 7–9. A certain program is recorded in the hard disk HD beforehand, and edit information about this program is stored in the edit information storing unit 101. FIG. 3 shows an example of edit information stored in the edit information storing unit 101.

A pointer in the reading controlling unit 102 is expressed by P in FIG. 7. This pointer P points out frames to be read from the hard disk HD for one block transfer. Value of the pointer P is incremented by a certain value upon each block transfer to point out frames to be read next. To be noted, value of the pointer P does not coincide with value of the frame identifier in the edit information storing unit 101. Instead, value of the pointer P is incremented from the initial edit information by minimum cut length of frames.

The reading controlling unit 102 has a counter n in FIG. 8 which progresses by one upon each output of one field data from the FIFO. Once the counter n reaches minimum cut length of fields (eight in this embodiment), it is reset to one, then starts to count again up to eight. Value of n represents the arrangement order of a field within minimum cut length of frames currently pointed by the pointer P.

In the above circumstances, when receiving a reproduction order from the outside, a program in FIG. 7 starts, and initial settings such as reset of the pointer P are operated (S1). Subsequently, edit information for the first minimum cut length is read from the edit information storing unit 101 and is transferred to the head migration. HD rotation controlling unit 1032 of the image storing unit 103 (S3). At the end of each block transfer cycle (S4), the pointer P is incremented (S6), and edit information for the next minimum cut length is read and is sent to the head migration•HD rotation controlling unit (S3). When incremented value of the pointer P exceeds value representing the final edit information (S2), the block transferring operation is completed as for one entire program, so that the control is ended. Even when the pointer P does not reach value representing the final edit information, the control is ended if underflow occurs at the FIFO. Underflow occurs when the FIFO cannot send any data as no field data remains therein. To be concrete, underflow occurs when the head sector is located at a faulty sector of the hard disk HD, and it tries to read data in vain repeatedly.

When edit information for minimum cut length is sent from the reading controlling unit 102 to the hard disk driving unit, the hard disk driving unit drives the head and hard disk to read minimum cut length of frames as referring to start address and end address included in the received edit information. Accordingly, minimum cut length of frames are transferred from the hard disk to the FIFO as block data. Being in synchronous with one half of frame synchronous signal from the reading controlling unit 102, one field of data is read from the FIFO to the reading controlling unit 102. As shown in FIG. 8, the reading controlling unit 102 sets the counter n to 1 when the FIFO starts to transmit field data (S11), then transfers the first field data to the image reproducing unit 106. Subsequently, the counter n is incremented (S14) to transfer the next field data (S13). This is repeated until the counter n reaches minimum cut length of fields (=8) (S15). Once the counter n reaches eight, it is reset to 1, and the same operation (S12→S16) is repeated upon each reception of field data of newly transferred block data from the FIFO. The above operation is repeated being in synchronous with a half of frame synchronous signal to transfer field data to the image reproducing unit 106. As a result, the image display unit 107 can display reproduced images successively.

If underflow of the FIFO occurs because of a damage on the hard disk (S12), data transfer to the image reproducing unit stops. Accordingly, image display is interrupted, and processing is forwarded to step S17. At step S17, values of the pointer P and the counter n at the moment when underflow occurs are read, and frame number and field number including faulty sector are obtained from these values and edit information. For example, when the location of a faulty sector is represented by slash lines in FIG. 10, it is detected that the faulty sector is located at the second field d2 of the frame D at S17. Subsequently, at S18 a range of frames to be copied are calculated according to edit information pointed by the pointer P. Hereinafter, in order to guarantee successive reproduction, a plurality of frames corresponding to minimum cut length and including frame with a faulty sector are detected. If minimum cut length includes four frames, and faulty sector is included in the frame D, the frames B to E are selected for copy, as shown in FIG. 11. In this case, the frames A to D, C to F, or D to G may also be selected for copy as minimum cut length includes four frames. However, basically a range of frames pointed by the pointer P are selected.

After S18, the vacant area storing unit 105 looks into vacant area reserved within the hard disk HD for sectors which are wide enough to copy minimum cut length (S19). Then, the frames B to E which were selected for copy are copied into the vacant area (S20). The frames B, C, E without a faulty sector are directly copied into the vacant area. As for the frame D, a first field d1 without a faulty sector is copied into both a first field d1' and a second field d2' of the vacant area. As a result, no faulty sector is included in copy; reproduction can be operated naturally as image data is recorded in both fields. Further, the same image is copied into the first field d1' and the second field d2' as original image is barely different between the first and the second fields; thus, the original image can be reconstructed almost perfectly. FIG. 9 is the detailed description of S20 in FIG. 9.

After S20, edit information in the edit information storing unit 101 pointed by the pointer P is replaced with edit information after copy (S21). FIG. 12 shows edit information after copy.

Figure 13:
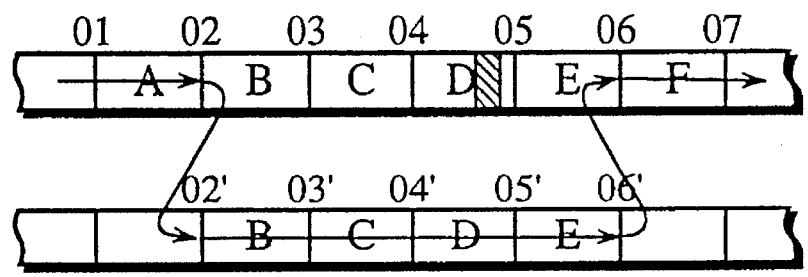
FIG. 13 illustrates reproduction after copy processing.

FIG. 13 shows an example of reading of image information after copy. The reading controlling unit 102 obtains edit information in FIG. 12 from the edit information storing unit 101, and reads frames in the order of A, B, C, D', E, and F. Thus, data areas can be read successively.

According to the present invention set forth above, minimum cut length is guaranteed no matter which division is read currently; therefore, seek time is reduced, so that successive reproduction is achieved.

Although a hard disk is employed as the image recording unit herein, an optical magnetic disk or a solid memory is similarly applicable.

Figure 14:
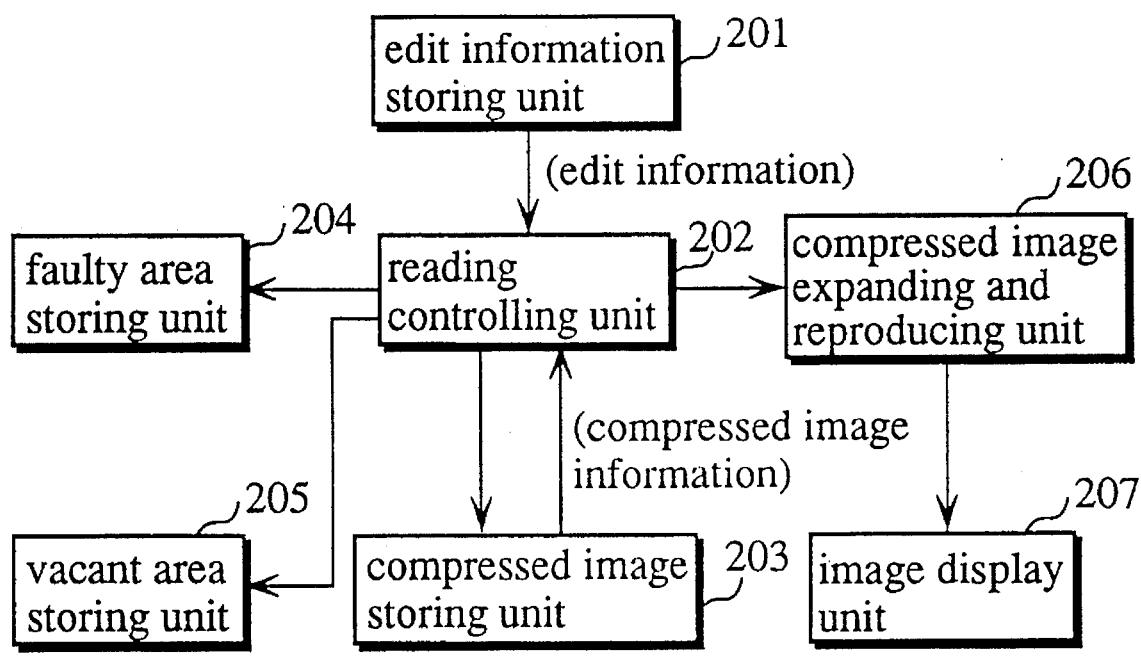
FIG. 14 is a block diagram depicting an image reproducing device in a second embodiment of the present invention.

Although images are directly recorded, compressed images may be recorded, instead. In this case, a reproducing unit expands retrieved compressed image, and reproduces it. FIG. 14 is a block diagram depicting an image reproducing device for expanding compressed images. The basic configuration of each components, such as a reading controlling unit 202 is the same as that relating to the embodiment, so that the description is not repeated.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image reproducing device comprising:

an image storing means for storing video frames, having a preset minimum frame number which guarantees successive reproduction if the video frames are stored successively in physical sense, reading the video frames at speed which is in synchronous with a display cycle of one video frame as long as more than the minimum frame number of video frames are stored successively, and halting output of each video frame if its storage area includes a faulty area;

an edit information storing means for storing edit information which identifies which area of the image storing means stores each video frame;

a reading controlling means for directing order of the video frames to be read from the image storing means and controlling output of each video frame being in synchronous with the display cycle;

a reproducing and displaying means for reproducing and displaying the video frames outputted from the image storing means in order;

a faulty area detecting means for monitoring output of each video frame being in synchronous with the display cycle, and detecting the video frame with the faulty area;

a faulty area location calculating means for calculating location of the video frame which includes the faulty area;

a copy range setting means for setting a plurality of video frames which include the video frame with the faulty area and which are more than the preset minimum frame number as a copy range;

a vacant area reserving means for reserving a vacant area within the image storing means to which all the video frames set as the copy range can be copied;

a copy means for directly copying the video frames set as the copy range except the video frame with the faulty area into the vacant area, and processing the video frame with the faulty area by copying a preset range of image which locates outside the faulty area of the video frame into a part of the vacant area which is reserved for the video frame repeatedly; and an edit information updating means for updating the edit information stored in the edit information storing means into the edit information obtained after copying by the copy means.

2. The image reproducing device of claim 1, wherein the image storing means comprises a recording medium for recording image including the video frames, a head for reading the preset minimum frame number of video frames which guarantees successive reproduction as a single block in a preset block cycle, and a FIFO to which the retrieved block data is transferred.

3. The image reproducing device of claim 2, wherein the recording medium is one of a hard disk and an optical disk.

4. The image reproducing device of claim 2, wherein the FIFO outputs underflow when it tries to output the video frame with the faulty area, and the faulty area detecting means judges the underflow as the video frame with the faulty area.

5. The image reproducing device of claim 4, wherein each video frame includes two image fields to be scanned according to an interlaced scanning method;

the faulty area detecting means detects the field with the faulty area;

the faulty area location calculating means calculates location of the faulty area relating to the frame and the field; and the copy means includes a double copying means for dividing the video frame including the faulty area into a field including the faulty area and a field which does not include the faulty area, setting the field which does not include the faulty area as the copy range, and copying the copy range into the vacant area which is reserved for the video frame which includes the faulty area twice.

6. The image reproducing device of claim 5, wherein the reading controlling means comprises a pointer for designating the video frames for a single block to be transferred from the recording medium to the FIFO, and changing its value at the end of each block transfer, and a counter for changing its value upon each output of one image field from the FIFO and resetting itself when the pointer changes its value; and the faulty area location calculating means calculates location of the faulty area relating to the frame and the field according to the value of the pointer and the value of the counter obtained at the moment that the FIFO outputs the underflow.

7. The image reproducing device of claim 6, wherein the copy range setting means sets the video frames pointed by the pointer at the moment that the FIFO outputs the underflow as the copy range.

8. The image reproducing device of claim 1, wherein the image storing means stores a compressed image, and the reproducing and displaying means has an expanding unit for expanding the compressed image from the image storing means.

9. The image reproducing device of claim 8, wherein the image storing means comprises a recording medium for recording image including the video frames, a head for reading the preset minimum frame number of video frames which guarantees successive reproduction as a single block in a preset block cycle, and a FIFO to which the retrieved block data is transferred.

10. The image reproducing device of claim 9, wherein the FIFO outputs underflow when it tries to output the video frame with the faulty area, and the faulty area detecting means judges the underflow as the video frame with the faulty area.

11. The image reproducing device of claim 10, wherein each video frame includes two image fields to be scanned according to an interlaced scanning method;

the faulty area detecting means detects the field with the faulty area;

the faulty area location calculating means calculates location of the faulty area relating to the frame and the field; and the copy means includes a double copying means for dividing the video frame including the faulty area into a field including the faulty area and a field which does not include the faulty area, setting the field which does not include the faulty area as the copy range, and copying the copy range into the vacant area which is reserved for the video frame which includes the faulty area twice.

12. The image reproducing device of claim 11, wherein the reading controlling means comprises a pointer for designating the video frames for a single block to be transferred from the recording medium to the FIFO, and changing its value at the end of each block transfer, and a counter for changing its value upon each output of one image field from the FIFO and resetting itself when the pointer changes its value; and the faulty area location calculating means calculates location of the faulty area relating to the frame and the field according to the value of the pointer and the value of the counter obtained at the moment that the FIFO outputs the underflow.

13. The image reproducing device of claim 12, wherein the copy range setting means sets the video frames pointed by the pointer at the moment that the FIFO outputs the underflow as the copy range.

* * * * *